United States Patent [19]

Gutner et al.

[11] E Patent Number: Re. 32,134

[45] Reissued Date of Patent: May 6, 1986

[54] DRAWER SLIDE ASSEMBLY

[76] Inventors: Kenneth H. Gutner, 3285 Dato, Highland Park, Ill. 60635; Jay S. Waxman, 9352 Kilbourn, Skokie, Ill. 60076

[21] Appl. No.: 543,133

[22] Filed: Oct. 18, 1983

Related U.S. Patent Documents

Reissue of:

[64] Patent No.: 4,305,625
Issued: Dec. 15, 1981
Appl. No.: 190,330
Filed: Sep. 24, 1980

U.S. Applications:

[63] Continuation-in-part of Ser. No. 115,946, Jan. 28, 1980, abandoned.

[51] Int. Cl.[4] ..... F16C 29/04
[52] U.S. Cl. ..... 308/3.8
[58] Field of Search ..... 308/3.6, 3.8, 3 R, 6 R; 312/330 R, 341, 347, 345

[56] References Cited

U.S. PATENT DOCUMENTS

| | | | |
|---|---|---|---|
| 3,320,003 | 5/1967 | Edelson et al. | 308/3.6 |
| 3,328,107 | 6/1967 | Gutner | 308/3.6 |
| 3,393,019 | 7/1968 | Fraser et al. | 308/3.6 |
| 3,650,577 | 3/1972 | Gutner | 308/3.6 |
| 3,658,394 | 4/1972 | Gutner | 308/3.6 |
| 3,702,717 | 11/1972 | Gutner | 308/3.6 |
| 3,926,492 | 12/1975 | Gutner | 308/3.6 |
| 3,944,302 | 3/1976 | Fourrey | 308/3.8 |
| 3,981,553 | 9/1976 | Gutner | 312/347 |
| 4,061,375 | 12/1977 | Mertes | 308/3.6 |
| 4,305,625 | 12/1981 | Gutner et al. | 308/3.8 |

*Primary Examiner*—Lenard A. Footland
*Attorney, Agent, or Firm*—Tilton, Fallon, Lungmus & Chestnut

[57] ABSTRACT

A drawer slide assembly including a generally T-shaped guide mounted on the article of furniture and a C-shaped slide mounted on the underside of a drawer receivable within the furniture article, each of the slide and guide being equipped with plastic elements to minimize noise while providing a lubricating effect.

30 Claims, 18 Drawing Figures

112
116
118
111
114
115
117
113
110

129a
117
130
128
131
132
122
113
127
136
130
145a
142
143
145a
122
136a
119
120
145
116
141

14
133
134
135
137a
112

146
13
147
130
118
144
143
115
126
117
116
124
123
125
113
136
133
143
122
146
147
129a
126
137
138
142
122
117
135

FIG. 15
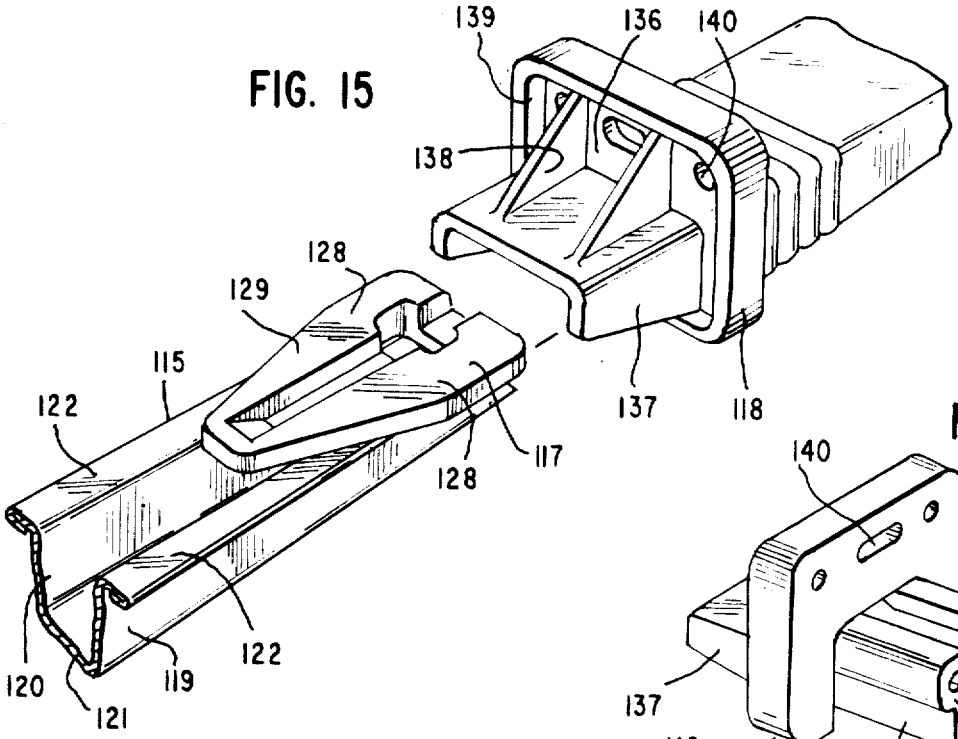
FIG. 18
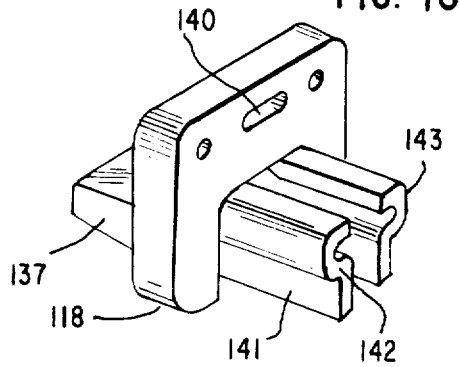
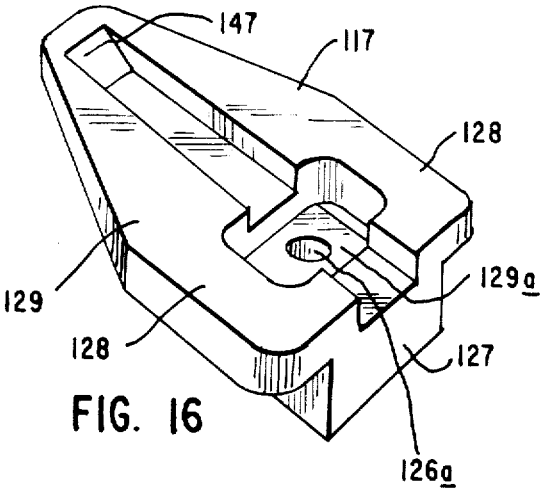
FIG. 16
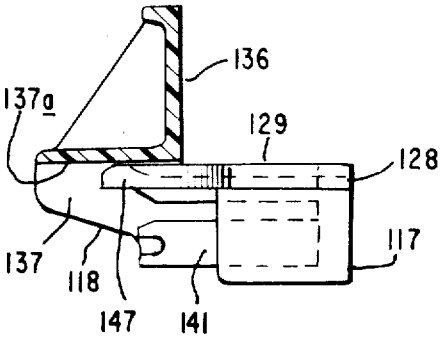
FIG. 17

DRAWER SLIDE ASSEMBLY

Matter enclosed in heavy brackets [ ] appears in the original patent but forms no part of this reissue specification; matter printed in italics indicates the additions made by reissue.

This is a continuation-in-part of our copending application Ser. No. 115,946 filed Jan. 28, 1980, now abandoned.

BACKGROUND AND SUMMARY OF THE INVENTION

This invention relates to a drawer slide assembly and, more particularly, to an assembly including a T-shaped guide and a C-shaped slide, constructed of metal, but equipped with plastic bearing elements.

For the most part, drawer slide assemblies have used wood as the material of construction for the T-shaped stationary guide—see U.S. Pat. Nos. 3,328,107; 3,365,261; 3,658,394 and 3,981,553. However, metal guides were disclosed in U.S. Pat. Nos. 3,650,577; 3,702,717, 3,844,627 and 3,850,482. A plastic guide is shown in U.S. Pat. No. 3,926,492.

None of the foregoing arrangements has met contemporary demands of reliable, trouble-free operation while minimizing cost. The wood elements very often warped to frustrate trouble-free sliding operation and were often difficult to install with accuracy. On the other hand, having both the slide and guide constructed of metal resulted in irritating noise and lack of trouble-free operation. These problems have been solved by the instant invention which employs metal as the material of construction of both members but further employs a unique surfaced bearing constructed of plastic in the guide and a unique plastic adapter as a bearing in the slide.

Other objects and advantages of the invention may be seen in the details of the ensuing specification.

DETAILED DESCRIPTION

The invention is described in conjunction with the accompanying drawing, in which—

Figures 10, 11, 12, 13, 14:
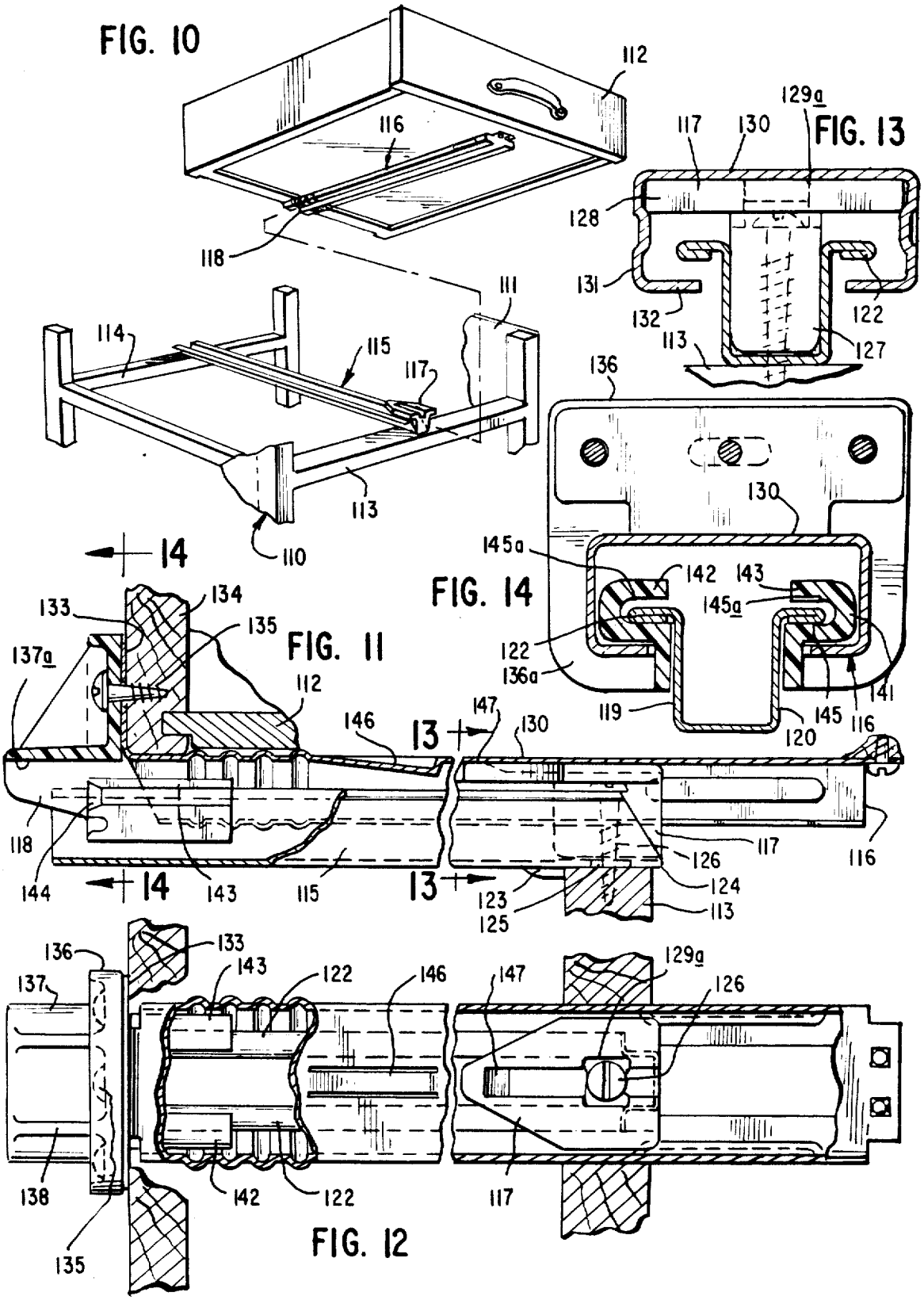
FIG. 10 is a view similar to FIG. 1 but of a modified form of the invention.
FIG. 11 is a fragmentary longitudinal sectional view of the assembled slide and guide members of FIG. 10.
FIG. 12 is a fragmentary top plan view, partially in section of the members of FIG. 11.

FIGS. 13 and 14 are sectional views along the sight lines 13—13 and 14—14, respectively of FIG. 11;

FIG. 15 is a fragmentary perspective view of the modified form of invention depicted in FIGS. 10–14;

FIG. 16 is an enlarged perspective view of the plastic element associated with the guide member in FIG. 15;

FIG. 17 is a fragmentary sectional view to show the sliding relationship of the plastic element in the two members; and FIG. 18 is a perspective view of the plastic element associated with the slide member of FIG. 15.

Figure 1:
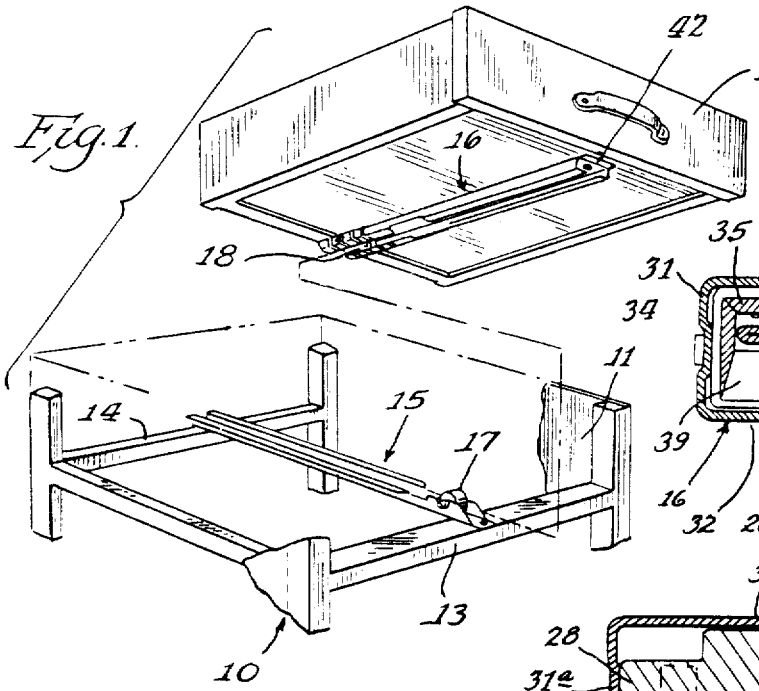
FIG. 1 is a fragmentary exploded perspective view of an article of furniture equipped with one version of the inventive slide assembly.

In the first illustration given, and with reference first to FIG. 1, the numeral 10 designates generally an article of furniture—such as a dresser—which is equipped with a front opening 11 for the receipt of a drawer 12. The bottom portion of the opening 11 is defined by a front parting rail 13 which is aligned with the usual rear parting rail 14 for the support of a generally T-shaped guide member which herein is generally represented by the numeral 15. Thus, the guide 15 is the stationary member which cooperates to guide the sliding member generally designated 16 and which is affixed to the under side of the drawer 12.

Figure 3:
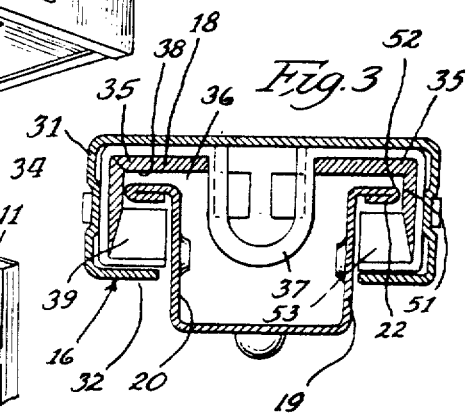
FIG. 3 is an enlarged sectional view taken along the line 3—3 of FIG. 2.
Figure 5:
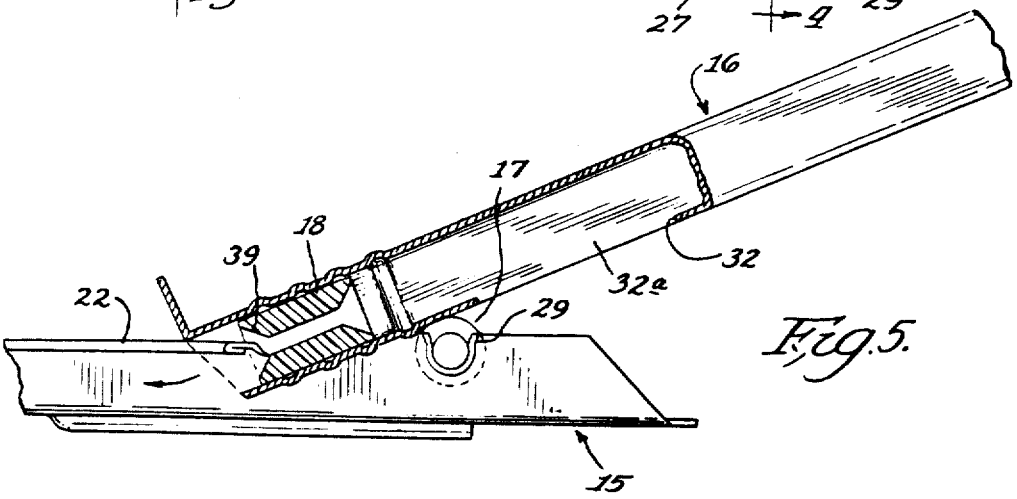
FIG. 5 is a fragmentary side elevational view, partially in section, of the slide and guide members in the positions they assume when being assembled.

Still referring to FIG. 1, the numeral 17 designates a plastic element rotatably supported adjacent the front end of the guide 15 and which provides a bearing surface between the guide 15 and slide 16. At the rear thereof, the slide 16 is equipped with a plastic adapter 18 (better seen in FIGS. 3 and 5) and which provides a second bearing between the guide 15 and slide 16. As will be brought out in greater detail hereinafter, the plastic element 17 on the T-shaped guide and the plastic adapter element 18 on the C-shaped slide provide bearing supports to substantially avoid noise from metal to metal bearing contact while simultaneously providing a lubricating effect.

GUIDE CONSTRUCTION

Figure 7:
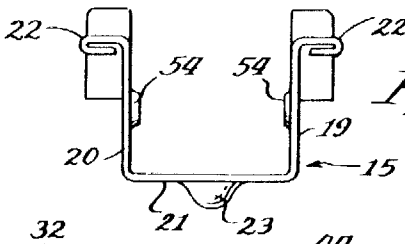
FIG. 7 is an end elevational view of the guide member of FIG. 6.

Reference is now made to FIG. 7 which shows the generally T-shaped guide 15 as viewed from the end thereof. The stem portion of the T-shape is provided by vertically extending spaced apart walls 19 and 20 connected at their bottom ends by a cross wall 21. At the upper ends of the walls 19 and 20, the metal thereof is deformed sidewardly and outwardly to form flanges as at 22 and which define wings of the cross of the T-shape.

Figure 6:
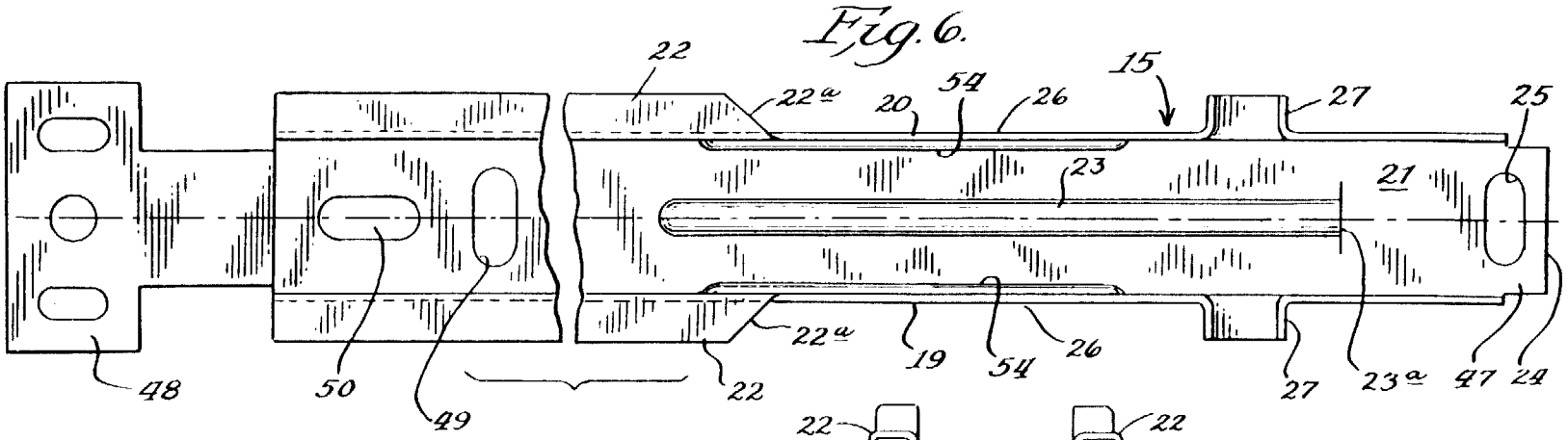
FIG. 6 is a fragmentary top plan view of the guide member.

Also seen in the central bottom portion of FIG. 7 is a depending rib 23 which, as can be appreciated from a consideration of FIG. 6, extends longitudinally of the bottom cross wall 21. The rib 23 terminates a spaced distance as at 23a from the forward end 24 of the guide 15 and thereby provides a locater function as well as a rigidifying function. Still referring to FIG. 6, an elongated opening 25 is provided adjacent the forward end 24 for the purpose of securing in adjustable fashion the forward end of the guide 15 to the front parting rail 13.

Still referring to FIG. 6, it will be seen that the laterally extending flanges 22 terminate as at 22a a spaced distance from the forward end 24 of the guide 15. The flangeless or wingless portion of the guide as at 26 provides a means of entry for the slide 16 in the manner illustrated in FIG. 5.

Figure 4:
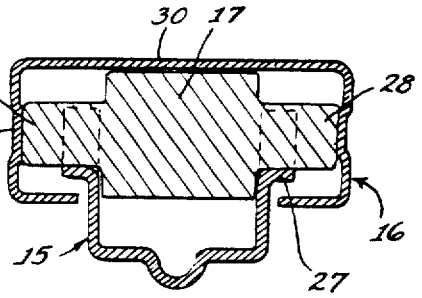
FIG. 4 is an enlarged sectional view taken along the line 4—4 of FIG. 2.

The wingless portions 26 (see FIG. 6) also provide an advantageous means for mounting the plastic element 17 of FIG. 4 which has the shape of a roller. More particularly, the walls 19 and 20 are deformed outwardly as at 27 (again see FIG. 6) to form generally semi-cylindrical pedestals for the mounting of the roller element 17. As can be appreciated from a consideration of FIG. 4, the roller element 17 is equipped with shaft extensions 28 integral with the arcuate surface portion of the roller 17 and which are carried within the pedestal 27. A removable function is afforded the roller 17 by means of slightly constricting the upper ends of the pedestals 27 as illustrated at 29 in FIGS. 4 and 5. Thus, different size rollers may be readily substituted in the case of differing drawer dimensions. As can be appreciated from a consideration of FIG. 4, the upper surface of the roller element 17 is arranged in bearing engagement with the bight portion 30 of the slide 16.

Figure 9:
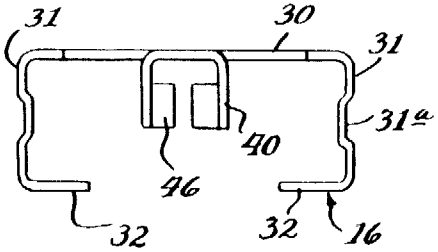
FIG. 9 is an end elevational view of the slide member of FIG. 8.

The specific details of the slide 16 can be appreciated from a consideration of FIG. 9 wherein the bight portion 30 is integral with depending arms 31 which, at their lower ends, are equipped with inwardly extending flanges 32—thus defining the classic C-shape of the drawer slide. Additionally, the arms 31 are deformed inwardly as at 31a (still referring to FIG. 9) which are in alignment with the ends or vertical surfaces of the shaft extensions 28 (see FIG. 4) to contact the same preferentially and limit lateral movement of the drawer relative to the article of furniture while rigidifying the slide. This can also be appreciated from a consideration of FIG. 4. In FIG. 4, it is also seen that the shaft extensions 28 of the plastic roller element 17 extend beyond the pedestals 27, the pedestals 27 having a lateral dimension sufficient to avoid sharp edge support of the shaft extensions and thereby avoid cutting the same.

SLIDE CONSTRUCTION

As brought out hereinbefore, the C-shaped slide has an upper transverse wall or bight portion 30 merging into depending arms 31 which in turn are equipped with integral inwardly extending flanges 32 (see FIG. 9). The arms 31 (see FIG. 9) adjacent the rear end of slide 16 are equipped with openings 33 (see FIG. 2) for the receipt of lugs or projections 34 provided on the adapter 18 (see FIG. 3).

The adapter 18 can be considered to be generally M-shaped in transverse section (see FIG. 3) and providing thereby side portions 35 which provide ways as at 36 for the wings 22 of the guides 15.

Figure 8:
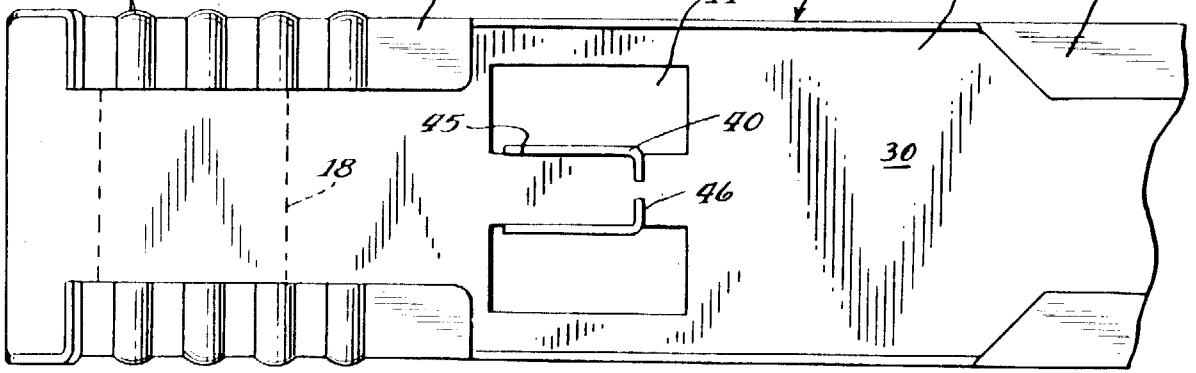
FIG. 8 is a fragmentary bottom plan view of the slide member.

Provided integral with the adapter 18 and between the side portions 35 is a resilient central portion 37 which may be flexed for installation of the adapter 18 within the slide 16. More particularly, the ways 36 provide horizontally extending surfaces 38 for contact with the flanges or wings 22. In the illustration given, the rear ends of the surfaces 38 are beveled as at 39 to facilitate entry into the ways of the wings 22—see particularly FIG. 5. Also to facilitate the assembly of the slide 16 on the guide 15, the inwardly extending flanges 32 are interrupted as at 32a (still referring to FIG. 5) so as to permit the entry of the roller element 17 into the interior of the C-shaped slide 16. As can be quickly appreciated from a consideration of FIGS. 8 and 9, the bight or upper wall 30 of the slide 16 is equipped with stop means as at 40 (located forwardly of the adapter 18) for engagement with the plastic roller element 17 to limit withdrawal of the drawer 12.

OPERATION

Figure 2:
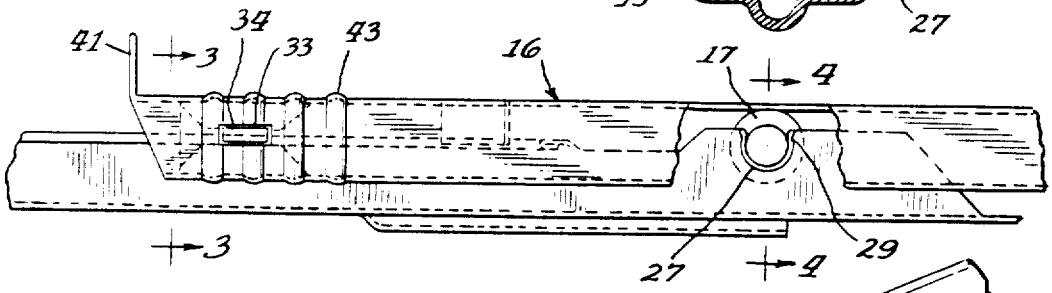
FIG. 2 is a fragmentary side elevational view of the slide and guide members in assembled relation.

In the practice of the invention, the metal portions of the guide 15 and slide 16 (see FIG. 1) are formed by appropriate shaping procedures. The slide 16, for example, is equipped with tabs at the ends thereof for advantageous connection to the drawer underside and back. In FIG. 2, the numeral 41 represents an upstanding tab at the slide rear end which is engageable with the rear of the drawer 12. The forward end of the slide is equipped with an appropriate tab as at 42 (see FIG. 1) for positionable connection with the underside of the drawer 12. Also, the slide is advantageously ribbed as at 43 (see the left hand portions of FIGS. 2 and 8) for rigidification of the slide. The ribs 43 are especially advantageous when positioned adjacent the rear end of the slide so as to better rigidify the same when the drawer is substantially pulled out of the opening 11. The shaping operation also develops the stop means 40—by providing cutouts as at 44 (see FIG. 8) from which tongues are struck as at 45 and further deformed as illustrated at 46 (see also FIG. 9).

The same shaping or stamping operations are performed on the metal portion of the guide 15 so as to develop end tabs as at 47 and 48 (see FIG. 6). The optimal rear end tab 48 is adapted to be deformed downwardly so as to abut the rear face of the rear parting rail 14 (see FIG. 1). Also, elongated openings as at 49 and 50 are provided adjacent the rear end of the guide 15 so as to provide adjustability during mounting.

After the metal portions of the guide 15 and slide 16 have been developed, suitably sized plastic elements 17 and 18 are removably installed by snap-in action. Depending upon the drawer draft, the sizes of the elements 17 and 18 may be advantageously varied so as to insure that the only contact between the slide and guide will be on the plastic surfaces.

The plastic roller element 17 carries the weight of the slide 16 (and therefore the drawer 12) on its surface as can be appreciated from the upper central portion of FIG. 4. The weight of the other end of the drawer is carried by the outwardly extending flanges 22 which abut the longitudinally extending bearing surfaces 38 of the ways 36 (see FIG. 3).

Any sideways movement between the slide and guide at the forward end of the drawer causes the arms 31 to engage the ends of the shaft extensions 28 (compare FIGS. 3 and 4) and thereby again develop a plastic to metal bearing contact. At the rear end of the drawer, any sidewards movement causes the sidewalls 51 of the ways 36 to contact the curved or rounded ends 52 of the outwardly extending flanges 22 (see FIG. 3). Thus, the folded over flanges 22 (constituting the wing portions of the T) not only provide rigidity but also a curved bearing edge.

Still further, the ways 36 are defined by integral inwardly extending flange portions 53 (still referring to FIG. 3) on the adapter 18. Thus, any possible contact between the walls 19 and 20 with the inwardly extending flanges 32 is avoided by preferential contact between the walls 19 and 20 and the plastic inwardly extending flanges 53.

Not only is there a complete avoidance of any metal to metal bearing contact, but further the guide and slide cooperate to effectively support the drawer in stable condition when the same is substantially removed. In addition to the ribs 43 provided on the slide 16 (see the left hand portion of FIG. 8), a longitudinally extending rib 54 is provided in each of the upstanding spaced apart walls 19 and 20 of the guide 15 adjacent the forward end thereof (see FIG. 6). This serves to support the concentrated load of the drawer when the same is pulled out.

Through the construction of the slide and guide, we have avoided the problems of the previous wood members which tend to warp and split—wood not being too stable under moist atmospheric conditions, particularly when soft wood is employed which is usually the case for elements that do not serve a decorative purpose.

VERSION OF FIGS. 10–18

In the second illustration given, and with reference first to FIG. 10, the numeral 110 designates generally an article of furniture—such as a dresser—which is equipped with a front opening 111 for the receipt of a drawer 112. Again, the bottom portion of the opening 111 is defined by a front parting rail—here 113 which is aligned with the usual rear parting rail 114 for the support of a generally T-shaped guide which herein is generally represented by the numeral 115. Thus, the guide 115 is the stationary member which cooperates to guide the sliding member generally designated 116 and which is affixed to the underside of the drawer 112.

Still referring to FIG. 10, the numeral 117 designates a plastic element fixedly supported adjacent the front end of the guide 115 and which provides a bearing surface between the guide 115 and 116. At the rear thereof, the slide 116 is equipped with a plastic adapter 118 (better seen in FIGS. 11 and 15) and which provides a second bearing between the guide 115 and slide 116. As has been brought out previously, the plastic element on the T-shaped guide and the plastic adapter on the C-shaped slide provide bearing supports to substantially avoid noise from metal to metal bearing contact while simultaneously providing a lubricating effect.

CONSTRUCTION OF GUIDE 115

The construction of guide 115 of this version of the invention is substantially the same as that of guide 15 except that it is simpler in not having to provide a rotatable mounting for the plastic element 117. This can be appreciated by referring to FIG. 15 which shows the generally T-shaped guide 115 as viewed in section. The stem portion of the T-shape is provided by vertically extending spaced apart walls 119 and 120 connected at their bottom ends by a cross wall 121. At the upper ends of the walls 119 and 120, the metal thereof is deformed sidewardly and outwardly to form flanges as at 122 and which define wings of the cross of the T-shape.

As in the prior version, the guide 115 has a locating means 123 (see FIG. 11) spaced from the forward end 124. Also present is an elongated opening 125 adjacent the forward end 124 thereof th accommodate a woodscrew 126. The screw 126 extends into the front parting rail 113 and additionaly serves to secure the plastic element 117 thereto. In this version, the wings 122 extend the entire length of the guide 115 inasmuch as there is no need to provide a means for mounting a rotatable plastic element and for inserting the slide thereover. Also provided, but not shown in this version, are openings adjacent the rear end of the guide 115 for the purpose of securing the guide to the rear parting rail 114. Such openings can be seen at 49 and 50 in FIG. 6 of the first version described.

The plastic element 117 can be seen best in FIG. 16 and includes a unitary block 127 equipped with horizontally extending integral flanges 128. The block 127 is press-fitted between the walls 119 and 120 as can be best seen in FIG. 14. The flanges 128 extend parallel to the wings 122 but are spaced thereabove—again see FIG. 13. The top surface 129 is recessed at 129a (see FIGS. 12 and 16) to accommodate the woodscrew 126 entering into the opening 126a and to provide a flexing function to be described.

As can be appreciated from a consideration of FIG. 13, the upper surface 129a of the plastic element 117 is arranged in bearing engagement with the bight portion 130 of the slide 116.

CONSTRUCTION OF SLIDE 116

Similar to what was brought out hereinbefore, the slide 116 is C-shaped, having an upper transverse wall or bight portion 130 merging into depending arms 131 which in turn are equipped with integral inwardly extending flanges 132 (see FIG. 13). Again, the extreme rear end of the slide 116 is equipped with an upstanding tab 133—see FIG. 11. This serves to secure the slide 116 to the rear wall 134 of the drawer 112 by means of woodscrews 135—these also serve to secure the plastic adapter 118 to the drawer 112 (still referring to FIG. 11). Thus, both elements 117 and 118 are secured to their respective metal parts by the same means that secures the metal part to the particular portion of the article of furniture, i.e., one fastening performs a dual function.

The construction of the adapter 118 can be best appreciated from a consideration of FIGS. 15 and 17. Again the plastic adapter element 118 is provided in the form of a unitary piece. Essentially, it is horizontally elongated with an upstanding central flange or wall as at 136. On the forward side of the flange 136, the element 118 is equipped with a generally inverted U-shaped projection 137. This is shaped to receive and pass the flanges 128 of the plastic element 117, see particularly FIG. 15. The projection 137 provides an important visual aid when the drawer is being installed—projecting as it does beyond the rear wall 134 of the drawer (see FIG. 11), the person handling the drawer can readily align it with the flanges 128 of the element 117 of the guide 115 (see FIG. 15). Also, it provides one anchor for the integral rigidifying ribs 138 that extend between the projection 137 and the flange 136. The wall-like flange 136 is further rigidified by the partial perimetric flange or shoulder 139. The flange 136 is apertured as at 140 for the receipt of the woodscrews 135 as seen in FIGS. 11 and 12.

Extending rearwardly from the flange 136 is the portion 141 (see FIG. 18) of the adapter 118 which receives in sliding relationship the wings 122 of the guide 115. As can be appreciated from a consideration of FIG. 18, the portion 141 includes opposed ways as at 142 and 143 which are essentially question-mark in shape and which also can be seen in the central portion of FIG. 14. At their rear ends, ways 142 and 143 have beveled openings as at 144 in the extreme left hand lower portion of FIG. 11. This also facilitates the installation of the drawer slide 116 on the furniture article guide 115. The ways 142 and 143 provide horizontally extending surfaces (see FIG. 14) as at 145 for contact with the wings 122.

As can be appreciated from a consideration of FIG. 11, the bight or upper wall 130 of the slide 116 is equipped with stop means as at 146 for engagement with the rear end 147 (see also FIG. 16) of the plastic element 117 to limit withdrawal of the drawer 112. More particularly, a portion of the plastic element 117 is cantilevered as at 147 (see FIG. 17) so as to yield after engagement with the detent-stop means 146 and permit the drawer to be completely withdrawn from the article of furniture 110.

OPERATION OF SECOND VERSION

In the operation of the embodiment of the invention depicted in FIGS. 10–18, the metal portions of the guide 115 and slide 116 may be formed as described previously with respect to the first-described embodiment. This includes the provision of the various ribs, tabs, stop means, etc.

After the metal portions of the guide 115 and slide 116 have been developed, the plastic elements 117 and 118 are installed simultaneously with these elements on the article of furniture 110 and drawer 112, respectively. As mentioned previously, the drawer 112 is advantageously introduced into the drawer opening 111 by virture of the projection 137 which affords a visual alignment means with the flanges 128. The surface 137a (see the left hand portion of FIG. 11) is aligned with the underside of the bight 130 so that there is no need for manipulating the drawer during installation. Further, the ways 142 and 143 are spaced below the surface 137a to receive the wings 122 when the upper surface 129 of the flanges 128 is in contact with the surface 137a. In other words, the distance between the surface 129 and the wings 122 is approximately equal to the distance between the surface 137a and the ways 142, 143. Thus, the control of the dimension is completely within the hands of the plastic element manufacturer once the depth of the trough in the stem of the T-shaped guide 115 is known. The height of the flanges 128 above the wings 122 is readily adjusted by adjusting the height of the block 127.

The interior bearing surfaces of the ways 142 and 143 as at 145 and 145a (see FIG. 14) are spaced apart slightly greater than the thickness of the wings 122. This makes for a convenient and advantageous sliding action and also takes into account the possibility that the person withdrawing the drawer may lift the same slightly so that the wings 122 will bear against the surfaces 145 (as shown in FIG. 14) rather than having the surfaces 145a bear against the wings 122 which is the normal condition of the drawer when at rest. Also, as can be appreciated from FIG. 14, any sideward movement of the drawer still results in the metal portion of the guide 115 bearing only against the plastic of the slide 116, not the metal thereof.

Upon withdrawal of the drawer 112, the stop means 146 engages the forward end 147 of the plastic element 117. This is a tactile signal to the person pulling the drawer out that further withdrawal will remove the drawer 112 from the article of furniture 110. By pulling further on the drawer, the forward cantilevered portion 147 deflects downwardly from the condition of FIG. 11 so as to permit the stop means 146 to pass over the extreme forward end of the projection 147 and enter into the slot 129a. Thereafter, complete removal of the drawer is possible.

While in the foregoing specification a detailed description of the invention has been set down for the purpose of illustration, many variations in the details hereingiven may be made by those skilled in the art without departing from the spirit and scope of the invention.

We claim:

1. A drawer slide assembly comprising an elongated generally T-shaped stationary metal guide member adapted to be secured to the interior of a drawer-equipped article of furniture extending rearwardly from the center of a drawer opening in the front of the article and an elongated, generally C-shaped metal slide member adapted to be secured to the underside of a drawer in ensleeving relation with said guide member, said guide member being equipped with a plastic element adjacent the front end thereof in bearing relation to said C-shaped slide member, said slide member being equipped with a plastic adapter element adjacent the rear end thereof in bearing relation with said T-shaped guide member whereby noise from metal to metal bearing is avoided while simultaneously providing a lubricating effect.

2. The structure of claim 1 in which said guide member has spaced apart walls defining the stem of said T-shape, said plastic element being mounted between said walls and projecting above the wing portions of said T-shape, said plastic adapter element being equipped with ways for engagement with said wing portions.

3. The structure of claim 1 in which said plastic adapter element is equipped with horizontally extending surfaces for bearing engagement with the wing portions of said T-shaped guide member and vertical surfaces adapted to contact the end of said wing portions and the stem of said T-shape preferentially to the metal portions of said slide member.

4. The structure of claim 3 in which said guide member plastic surface for bearing engagement with the bight portion of said C-shaped slide member and vertical side surfaces adapted to contact the arms of said C-shaped slide member preferentially to the metal portions of said guide member.

5. The structure of claim 4 in which said guide member plastic element includes a block fitted within said guide member and equipped with integral sidewardly extending flanges thereabove for contacting the bight and arm portions of said C-shaped slide member.

6. The structure of claim 4 in which said guide member plastic element is a roller having integral shaft extensions extending axially thereof, said roller providing an arcuate upper surface for bearing engagement with the bight portion of said C-shaped slide while the ends of said shaft extensions provide said vertical side surfaces.

7. The structure of claim 6 in which said T-shaped guide member has spaced apart vertically-extending walls defining the stem of said T-shape with sidewardly extending flanges defining the wing portions of said T-shape, said flanges terminating a spaced distance from the front end of said guide member to provide wingless upstanding walls for supporting said roller, said wingless upstanding walls being deformed laterally outward to provide integral cylindrically shaped pedestals for said shaft extension.

8. The structure of claim 7 in which said pedestals are constructed adjacent to the upper portions thereof to provide snap-in receipt of said shaft extensions.

9. The structure of claim 7 in which said shaft extensions extend beyond said pedestals, said pedestals having a lateral dimension sufficient to avoid sharp edge support of said shaft extensions and thereby avoid cutting the same.

10. The structure of claim 6 in which said slide is equipped with longitudinally extending laterally inward indentations in the arms thereof aligned with the ends of said shaft extensions to contact the same and limit lateral movement of said drawer relative to said article of manufacture while rigidifying said slide member.

11. The structure of claim 6 in which said slide member is equipped with openings in the arm portions of said C-shape adjacent in the rear end of said slide member, said adapter being equipped with laterally, outwardly-extending integral projections releasably received in said opening.

12. The structure of claim 11 in which said adapter is generally M-shaped in transverse section to provide a resilient central portion for flexing installation of said adapter in said slide member.

13. The structure of claim 11 in which said adapter has internal, longitudinally extending ways for receiving said guide wing portions, said wing portions having metal reversely folded on itself to provide rigidity and a curved bearing edge.

14. The structure of claim 6 in which said adapter is equipped with longitudinally extending ways for receiving said guide member wing portions.

15. The structure of claim 14 in which said ways have beveled entries for receiving said wing portions.

16. The structure of claim 1 in which said slide member is equipped with stop means depending from the bight portion of said C-shape and located forwardly of said adapter element, said stop means being arranged to engage said guide member plastic element to limit withdrawal of the drawer.

17. The structure of claim 1 in which each of said plastic elements is releasably mounted to provide ready installation of different sizes to accommodate the assembly to drawers of different draft.

18. The structure of claim 1 in which each of said elements and members is apertured for the receipt of fasteners to simultaneously secure each member and its associated element to a portion of said article of furniture.

19. A drawer slide assembly comprising elongated metal guide and slide members, said guide member having end tabs for connection to the front and rear parting rails of an article of manufacture, said guide member also having spaced apart upstanding walls and outwardly extending flanges commencing a spaced distance from the forward end thereof and extending rearwardly therefrom, said slide member having end tabs for connection to the front and rear of a drawer and a general C-shape in transverse section to embrace said outwardly extending flanges, said C-shape including inwardly extending flanges notched a spaced distance from the rear end thereof, said spaced distances affording an entrance for said slide when said drawer has the front end thereof tilted upwardly, said guide member being equipped with a plastic bearing element adjacent the forward end thereof and said slide member being equipped with a plastic bearing element adjacent the rear end thereof.

20. The structure of claim 19 wherein the guide plastic element is the only element providing a bearing surface thereof for contact with said slide and the slide plastic element is the only portion thereof providing a bearing contact with said guide member.

21. The structure of claim 19 in which said guide member plastic element is located within the said spaced distance of said guide member and the plastic element of said slide member is located between the rear end and said notch of said slide member.

22. A drawer slide assembly comprising elongated metal guide and slide members, said guide member having end tabs for connection to the front and rear parting rails of an article of manufacture, said guide member also having spaced apart upstanding walls and outwardly extending wings, said slide member having end tabs for connection to the front and rear of a drawer and a general C-shape and transverse section to embrace said outwardly extending wings, said guide member being equipped with a plastic element adjacent the front end thereof and equipped with means for simultaneous securement thereof with said guide member with said front parting rail, said guide member being adapted to be in bearing relation to said C-shaped slide member, said slide member being equipped with a plastic adapter element adjacent the rear end thereof and equipped with means for simultaneous securing of the same with said slide member to the rear of a drawer, said plastic adapter element being adapted to be in bearing relation with the wings of said guide member.

23. The structure of claim 22 in which said plastic adapter element includes an upstanding flange equipped with said securing means, slide means extending horizontally away from said flange on each side thereof, one of said slide means being received within said C-shaped slide member, and the other projecting away therefrom to provide a visual aligning means for installing said drawer in an article of furniture.

24. The structure of claim 23 in which said other slide means has a beveled opening to facilitate engagement of said plastic element with the wings of said guide member.

25. The structure of claim 22 in which said guide member is T-shaped to provide a stem portion having spaced apart vertically-extending walls, said plastic element having a block portion received within said vertically extending walls and horizontally extending flanges integral with said block portion, said flanges being a spaced distance above said wings to contact the bight of said C-shaped slide member.

26. The structure of claim 25 in which said plastic element is equipped with a cantilevered portion extending rearwardly above said block portion and in alignment with said flanges, said cantilevered portion providing a resilient detent means for ccoperation with said slide member in signaling a limit of withdrawal of the drawer from the article of furniture.

27. The structure of claim 26 in which the upwardly facing surface of said plastic element is equipped with a groove extending forwardly from said detent means to permit passage of complementary stop means on said slide member.

28. A drawer slide assembly comprising an elongated T-shaped stationary metal guide member adapted to be secured to the interior of a dresser-equipped article of furniture extending rearwardly from the center of a drawer opening in the front of the article, and an elongated generally C-shaped metal slide member adapted to be secured to the underside of a drawer in ensleeving relation with said guide member, said guide member being equipped with a plastic element adjacent the front end thereof in bearing relation to the bight of said C-shaped slide member, said guide member having end tabs for connection to the front and rear parting rails of said article of manufacture, said plastic element being equipped with means for simultaneously securing said plastic element and said guide member to said front parting rail, said metal guide having a spaced apart vertically extending walls defining the stem of said T-shape with sidewardly extending wings defining the wing portions of said T-shape, said plastic element having a block portion received within said vertically extending walls and horizontally extending flanges integral with said block portion spaced above said wings, said flanges providing an upper surface for bearing engagement with the bight of said C-shaped slide member, said slide member having end tabs for connection to the front and rear of a drawer and being equipped with a plastic adapter element adjacent the rear end thereof, said plastic adapter element being equipped with means for simultaneous securement with said slide member to the rear of said drawer, said plastic adapter element being equipped with integral ways for the receipt of the wings of said guide member whereby metal to metal bearing is avoided between said slide and guide members.

29. The structure of claim 28 in which said slide member is equipped with a depending stop means from the bight of the C-shape thereof, said plastic element being equipped with a cantilevered detent means for cooperation with said stop means for indicating the degree of withdrawal of a drawer from said article of furniture.

*30. A drawer slide assembly comprising a drawer-equipped article of furniture, an elongated stationary metal guide member secured to the interior of said article and extending rearwardly from the center of a drawer opening in the front of the article and an elongated, metal slide member adapted to be secured to the underside of a drawer, one of the said members being C-shaped and the other being T-shaped with said C-shaped member being arranged in ensleeving relation to said T-shaped member, said article adjacent the front thereof being equipped with plastic element means to facilitate sliding action of said drawer and said slide member being equipped with a plastic adapter element adjacent the rear end thereof in bearing relation with said guide member whereby noise from metal to metal bearing is avoided while simultaneously providing a lubricating effect.*

* * * * *